Jan. 3, 1928.
D. P. WEIR
DIFFERENTIAL DEVICE
Filed June 24, 1926
1,654,623
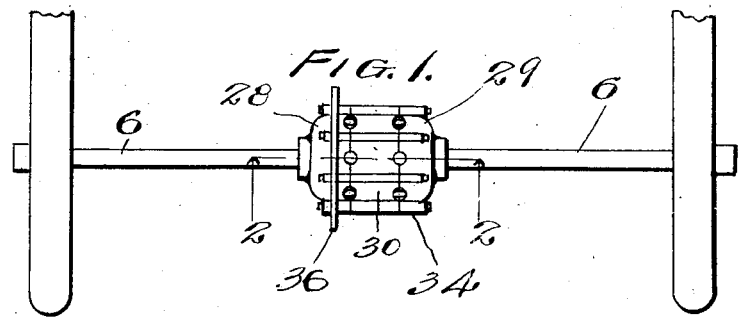
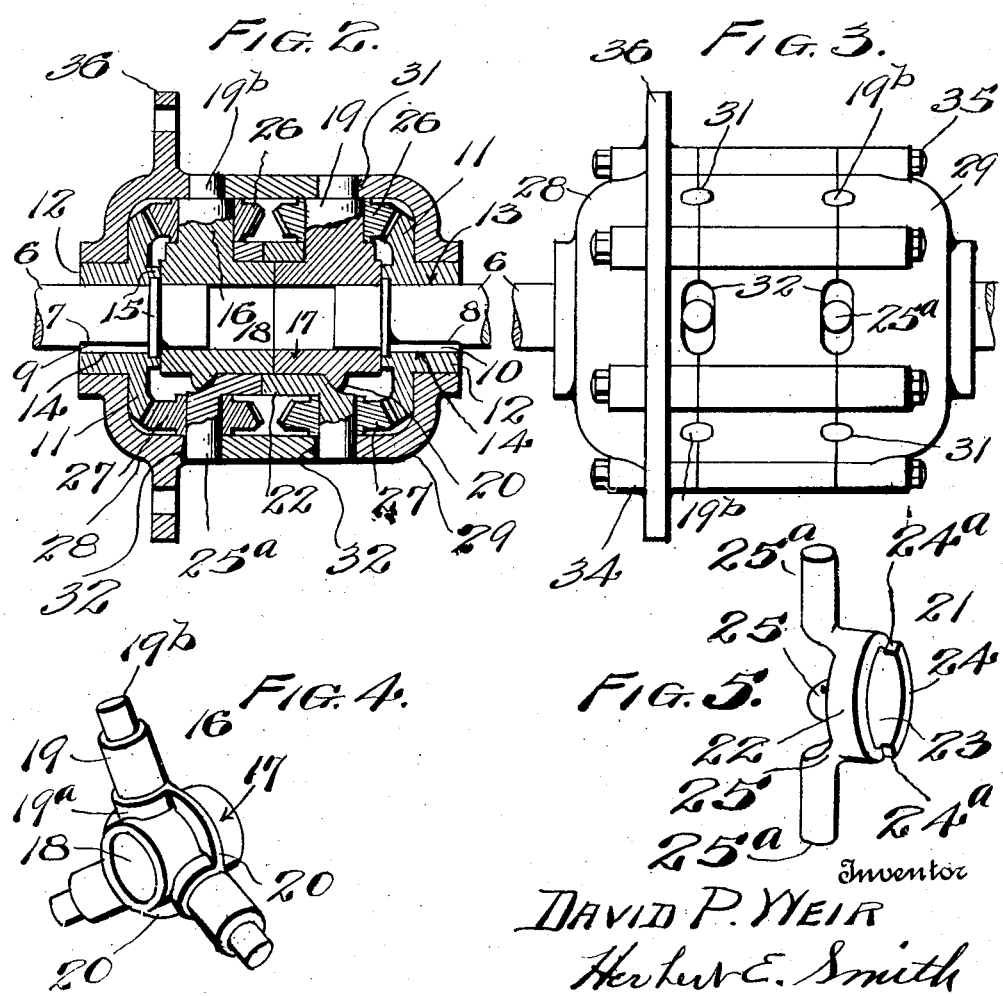

Patented Jan. 3, 1928.

1,654,623

UNITED STATES PATENT OFFICE.

DAVID P. WEIR, OF RATHDRUM, IDAHO.

DIFFERENTIAL DEVICE.

Application filed June 24, 1926. Serial No. 118,227.

My invention pertains to differential devices.

The primary object of the invention is to provide a differential device, by means of which the inner ends of two independently rotatable shafts may be connected and positively revolved in the same direction at the same time under variable conditions independently of the number of revolutions of each. When attached to the inner adjoining ends of the rear shaft sections of an automobile, and in rounding a curve, the device permits the outside drive wheel having the greater distance to travel to turn the fastest in proportion to the road traction of each wheel and the distance covered by each wheel, both wheels being compelled to turn in the same direction at the same time. The transmission power in this case ordinarily being applied principally to the wheel turning the slowest, otherwise to the wheel having temporarily the more favorable road traction.

The invention has reference to certain novel features fully explained herein and includes automatically adjustable racks having spindle arms slidably adjusted in oblong openings or slots in a surrounding case and supporting rotatably adjusted pinions meshing at all times with gears and adapted to interlock with associate pinions rotatably adjusted and supported on spider spindle arms also meshing at all times with the gears, the outer ends of the spider spindle arms being firmly held and supported by the same surrounding case. The mechanism is adapted to operate both forward and backward in the same manner.

With these and other objects in view the invention consists in the combination and arrangement of parts as described herein pointed out in the claims and illustrated in the drawings in which, Fig. 1, is a plan view of part of the rear axle construction of an automobile with the differential device attached.

Fig. 2, is an enlarged sectional view of the differential device and a portion of the inner ends of the axle shafts taken horizontally on the line 2—2 of Fig. 1.

Fig. 3, is a view showing the differential device as assembled.

Fig. 4, is a detailed view in perspective of one of the pinion spiders.

Fig. 5, is a detailed view in perspective of one of the pinion racks.

I have shown part of the rear axle construction of an automobile with the differential device attached as shown in Fig. 1, the housing having been temporarily removed. The axle being in two separate independently rotatable parts as shown in Fig. 2, hereinafter referred to as the shaft sections 6, 6. Each shaft section 6 being provided with key seats 7 and 8 near the inner ends thereof in which keys 9 and 10 may be seated.

Adjusted on each of the shaft sections 6, 6 near the inner ends thereof are gears 11, 11 (Fig. 2), and each of the gears 11, 11 has a hub 12, 12 on the back face with an opening 13, 13 extending the entire length through the center thereof for the passage of the inner ends of the shaft sections 6, 6. Cut into each of the gear hubs 12, 12 and extending the full length of the openings 13, 13 are key seats 14, 14. The two gears 11, 11 are securely attached to the shaft sections 6, 6 by means of the keys 9, 9 seated in the key seats or grooves 7, 7. The key seats 14, 14 in the gears 11, 11 are adjusted onto the keys 9, 9 and the keys 10, 10 are seated into the key seats 8, 8. The keys 10, 10 are held in position in the key seats 8, 8 by means of a surrounding boss or collar 15, 15 on the inner front face of each of the gears 11, 11 (Fig. 2).

Rotatably adjusted on the inner ends of the shaft sections 6, 6 and occupying positions side by side between the gears 11, 11 are two pinion spiders, hereinafter referred to as spiders 16, 16 (Fig. 2) one of which is shown in perspective in Fig. 4. Each of these spiders has a hub 17, 17 with an opening 18, 18 extending through the center thereof for the passage of the inner ends of the shaft sections 6, 6. The inner ends of the hubs 17, 17 loosely engage each other. The outer ends of the hubs 17, 17 loosely engage the outer ends of the boss collars 15, 15. Projecting from near the outer end of each of the hubs 17, 17 are spindle arms 19. Each of the spindle arms 19 has a prominent base 19ª on all but the extreme inner sides. The outer ends 19ᵇ are cut considerably smaller (Figs. 2 and 4) for use as journals and flanged reinforcements 20 connect the bases 19ª.

Rotatably adjusted on the inner hubs 17, 17 of the spiders 16, 16, and occupying positions side by side are two pinion racks hereinafter referred to as racks 21, 21 (Fig. 2)

one of which is shown in perspective in Fig. 5. Each of the racks has a short sleeve 22, 22 with an opening 23, 23 for the reception of the inner hubs 17, 17 of the spiders 16, 16. Each of the sleeves 22, 22 has a wing 24, 24 on the inner end thereof, and the ends of each wing 24 form shoulder stops 24ª, 24ª. The inner ends of the sleeves 22, 22 loosely engage each other, the wings 24, 24 occupying positions opposite in the same plane. The total length of the two arcuate wings 24, 24 is less than the circumference of either of the sleeves 22, 22 this allowing the sleeves 22, 22 to play back and forth on one another from one adjacent shoulder stop 24ª, 24ª to the other. Each of the sleeves 22, 22 has three L shaped spindle arms 25. The radial spindles 25ª occupy positions in the same plane, alternately, with the spider spindle arms 19.

Rotatably mounted on each of the spider spindle arms 19 are pinions 26 which mesh with the gears 11, 11, half of the pinions 26 meshing with one gear 11 and half with the other, at all times.

Rotatably mounted on each of the rack spindles 25ª are pinions 27 which are adapted to mesh with the gears 11, 11. The bevel pinions 27 on one rack 21 mesh with one gear 11 at all times and the pinions 27 on the other rack 21 mesh with the other gear 11 at all times. The pinions 27 on each rack 21 are adapted to also automatically engage and disengage with the associate pinions 26 immediately preceding them or with those immediately following them due to the fact that racks 21, 21 are independently rotatably mounted on the inner hubs 17, 17 of the spiders 16, 16. The pinions 27 on one rack 21 operate collectively and the pinions 27 on the other rack 21 operate collectively, and each of the racks 21, 21 on which the pinions 27 are assembled may operate independently of the other to a limited extent by means of space existing between the shoulder stops 24ª, 24ª (Fig. 3) allowing the sleeves 22, 22 to oscillate on each other the distance between the adjacent shoulder stops 24ª, 24ª. The pinions 27 on either of the racks 21, 21 are restrained from engaging the associate pinions 26 preceding them during the time the pinions 27 on the other rack 21 are at all engaged with the pinions 26 following them, and the pinions 27 on either of the racks 21, 21 are restrained from engaging the associate pinions 26 following them during the time the pinions 27 on the other rack 21 are at all engaged with the pinions 26 preceding them, by means of the shoulder stops 24ª, 24ª (Fig. 3).

Rotatably mounted on the hubs 12, 12 of the gears 11, 11 are cup shaped case parts 28 and 29 having bearing openings in the respective ends thereof for the reception of the hubs 12, 12. Occupying a position between the case parts 28 and 29 is a connecting tubular shaped case part 30 (Fig. 2). Cut into the edges of walls of each of the case parts 28, 29 and 30 at regular intervals are corresponding semicircular cutouts to form an annular series of three circular holes 31 (Figs. 1 and 3). Cut into the walls of each of the case parts 28, 29 and 30 midway between the holes 31 are three elongated openings or guide slots 32 (Figs. 1 and 3). The case parts 28, 29 and 30 are assembled with the semicircular cutouts in the connecting case part 30 adjacent to the semicircular cutouts in the case parts 28 and 29, forming circular openings 31 in which the outer ends 19ᵇ of the spider spindle arms 19 are adjusted, securely held and supported. Likewise the slots 32 form oblong openings in which the spindles 25ª are slidably adjusted allowing them to slide back and forth from one end of the slot 33 to the other. The guide slots 33 are provided precisely long enough to allow the rack spindles 25ª to slide back and forth therein far enough for the teeth on the pinions 27 to fully mesh with the teeth on either of the adjacent associate pinions 26 and, the outer ends of the rack spindle arms 25 to engage the ends of the oblong openings 34 nearest the engaged pinions 26 simultaneously. The inner end walls of the case parts 28 and 29 are adapted for loosely engaging and supporting the back faces of the gears 11, 11 (Fig. 2). Each of the case parts 28 and 29 have shoulders or lugs 34 and holes are provided in the alined lugs for the reception of the bolts 35 by means of which the case parts 28, 29 and 30 are securely held together. The case part 28 is further provided with a flanged collar 36 having transverse openings for the reception of bolts by means of which any suitable medium of power transmission may be attached (Figs. 1 and 3).

When the rigidly assembled case parts 28, 29 and 30 as a unit are revolved either forward or backward the spider spindle arms 19 are carried with them and consequently the pinions 26 (Figs. 1 and 3) and the rack spindle arms 25 lag in the oblong openings or slots 32 carrying with them the pinions 27. The pinions 27 are thereby engaged with the pinions 26 and interlock the pinions 26, 27 and the gears 11, 11 compelling the axle shaft gears 11, 11 and consequently the shaft sections 6, 6 to revolve with the case. When the axle shafts 6, 6 have a tendency to automatically adjust themselves because of the necessity of one axle shaft 6 to make a greater number of revolutions than the other on account of having a greater distance to travel, one or the other of the axle shaft gears 11, 11 carries its associate pinions 27 out of engagement with its associate pinions 26 to a neutral position between the associate pinions 26, thereby unlocking the said pinions 26, 27 and the associate gear 11, allowing said gear 11 to revolve freely on the said associate pinions 26 and 27 during the adjustment. As soon as the shaft sections 6, 6 are in a position to again travel equal distances during the same period the said associate pinions 27 reengage said adjacent associate pinions 26 thereby reinterlocking the said pinions 26, 27 and the associate axle shaft gear 11.

What I claim is:

1. The combination with a pair of shaft sections having gears thereon and a case for said gears, of a pair of spider frames secured in said case and bevel pinions journaled thereon for engagement with the gears, a second set of spider frames mounted to oscillate on the first pair and driving connections between the frames of the second set, and bevel pinions on said second set for engagement with the gears.

2. The combination with a pair of shaft sections having gears fixed thereon, of a case in which said gears are journaled, a pair of alined spider frames rigidly connected to said case, bevel pinions on said frames engaging said gears, a pair of oscillatable spider frames mounted on said frames and retained and guided in said case and driving connections between the oscillatable frames, and bevel pinions on said oscillatable spider frames for cooperation with said gears.

In testimony whereof I affix my signature.

DAVID P. WEIR.